United States Patent [19]

Mizokami

[11] Patent Number: 4,474,451
[45] Date of Patent: Oct. 2, 1984

[54] DIAPHRAGM CONTROL CIRCUIT FOR TTL AUTOMATIC ELECTRONIC FLASH

[75] Inventor: Kazunori Mizokami, Hachioji, Japan

[73] Assignee: Olympus Optical Company, Ltd., Tokyo, Japan

[21] Appl. No.: 438,326

[22] Filed: Nov. 1, 1982

[30] Foreign Application Priority Data

Feb. 19, 1982 [JP] Japan .............. 57-22580[U]

[51] Int. Cl.³ .................. G03B 15/05; G03B 7/087
[52] U.S. Cl. ............................. 354/418; 354/443
[58] Field of Search ................... 354/32–35, 354/41–44, 60 F, 139, 149, 416–418, 420, 422, 423, 448, 443

[56] References Cited

FOREIGN PATENT DOCUMENTS 55-11239  1/1980  Japan .
55-11238  1/1980  Japan .

Primary Examiner—William B. Perkey
Attorney, Agent, or Firm—Louis Weinstein

[57] ABSTRACT

A diaphragm control circuit associated with TTL automatic electronic flash is adapted to be used in a camera of the TTL direct photometry type and capable of photometry of light reflection from film surface. When the electronic flash is mounted on the camera for cooperation therewith, the diaphragm control circuit responds to a brightness of an object being photographed by automatically establishing an aperture value which produces an exposure period synchronized with the operation of the electronic flash. The diaphragm control circuit also assures that the aperture controlling operation takes place reliably over a given time interval so that an aperture value which is less by a given number of steps than the open value is established.

10 Claims, 4 Drawing Figures

DIAPHRAGM CONTROL CIRCUIT FOR TTL AUTOMATIC ELECTRONIC FLASH

BACKGROUND OF THE INVENTION

The invention relates to a diaphragm control circuit for a TTL (through-the-lens) automatic electronic flash, and more particularly, to a diaphragm control circuit for a TTL automatic electronic flash which may be used in a camera capable of photometry of reflection from a film surface and also having the capability to control the emission of light from the automatic electronic flash and in which a diaphragm control is enabled also during a photographing operation which takes place with the aid of the automatic electronic flash.

In a conventional combination of a single lens reflex camera and an automatic electronic flash, a value of diaphragm aperture specified by the electronic flash is automatically preset in the camera in response to a signal from the electronic flash such as a charging complete signal, and an exposure period is in fixed synchronized relationship with the operation of the electronic flash. Since the use of the electronic flash is required by a low level of illumination, which results in an insufficient amount of light incident to cause a dissatisfactory photometry, the diaphragm within a taking lens is fixed to an open value. However, when a picture is taken with the aid of the electronic flash with an open diaphragm, the depth of field will be greatly reduced to cause an "out-of-focus" picture even though the amount of light passing "through-the-lens" is maximized to increase the dynamic range of emission control.

Moreover, when the object being photographed is located in a near distance (for example, 2–3 m), there often happens that a picture is over-exposed when the flashlight photography is taken at the full open diaphragm value. For example, the proper exposure is obtained at the guide number GN=2.8 under the condition that the full open F number is 1.4 and the object distance is 2 m. It is difficult to properly control such a small amount of the light emission from the electronic flash as a guide number GN=2.8.

The described technique which uniquely defines a diaphragm value in response to a charging complete signal fed from the electronic flash is applicable to the type of automatic electronic flash which controls the amount of emission in accordance with its controlling capability. By contrast, a so-called TTL automatic electronic flash was recently developed for use with a camera of the TTL direct photometry type and capable of photometry of light reflection from the film surface, which camera controls the emission of light from the electronic flash. In this instance, a camera may utilize any arbitrary value of diaphragm aperture rather than being fixed to any particular value. When so used, the electronic flash is activated to compensate for any deficiency of natural light at the time a shutter is fully open, and hence it is unnecessary to synchronize an exposure period with the operation of the electronic flash, representing a large departure from the emission control with a conventional electronic flash.

When TTL automatic electronic flash is used in combination with a camera of the TTL direct photometry type and capable of photometry of light reflection from the film surface, the electronic flash may emit light or may not emit light depending on the choice of a diaphragm aperture except when a very bright illumination is provided to an object being photographed. Specifically, when the diaphragm aperture is reduced, the exposure supplied by natural light decreases to result in an increased length of exposure period, so that synchro contacts are closed to cause the emission of light from the electronic flash when the shutter is fully open (synchronized with the operation of the electronic flash). Conversely, when the diaphragm aperture is increased, an increased amount of exposure supplied by natural light results in a reduced length of exposure period, failing to close the synchro contacts and thus permitting the photographing operation to be performed under natural light alone.

However, since the intended purpose of having the electronic flash to cooperate with the camera is to achieve an electronic flash effect upon the photographing operation, it is desired that a diaphragm control assures a reliable activation of the electronic flash while avoiding the loss of merits of a photographing operation effected with the aid of TTL automatic electronic flash, namely, while utilizing the entire range of diaphragm values which can be manually chosen on the part of the camera.

It is also necessary that such diaphragm control prevents a diaphragm value close to an open diaphragm from being established since then the depth of field is reduced to degrade the image quality and the emission control of a small amount of light results in an overexposure of the object being photographed which is located in a near distance.

SUMMARY OF THE INVENTION

In view of the foregoing, it is an object of the invention to provide a diaphragm control circuit for a TTL automatic electronic flash for use with a camera of the TTL direct photometry type and capable of photometry of light reflection from the film surface in which when the electronic flash cooperates with the camera, a diaphragm value is automatically established depending on the brightness of an object being photographed which permits an exposure period to be obtained which is practically synchronized with the operation of the electronic flash and which assures that the diaphragm control be reliably performed over a given time so that a diaphragm value which is less by a given number of steps than the open value is established.

In the arrangement of the invention, the diaphragm aperture is not limited to any particular value as in the prior art, and the diaphragm control takes place while utilizing the merits of TTL automatic electronic flash. In this manner, except when an object being photographed is under very bright illumination, a diaphragm value is established which produces an exposure period, determined in accordance with the photometry of light reflection from the film surface and which is synchronized with the operation of the electronic flash. In this manner, a reliable emission of light from the TTL automatic electronic flash is obtained. It is assured that the diaphragm control continues over a given period from the start of reducing the diaphragm aperture whenever the electronic flash is used. In this manner, it is also assured that a diaphragm value which is used when an object being photographed is under dark illumination is less by a given number of steps than the open value, allowing a satisfactory image quality and a proper exposure to be obtained.

DESCRIPTION OF PREFERRED EMBODIMENT

Figure 1:
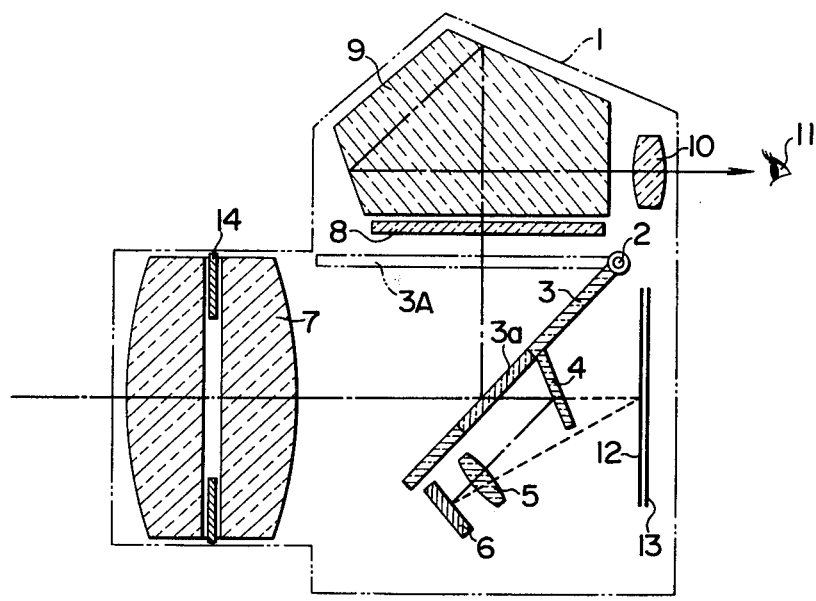
FIG. 1 is a schematic cross section of a single lens reflex camera capable of photometry of light reflection from film surface and adapted to incorporate a diaphragm control circuit according to the invention.

Referring to FIG. 1, there is shown a camera 1 including a mirror box (not shown), Within the mirror box, a movable mirror 3 which is used for observation purposes is rotatably mounted on a support pin 2, and carries a photometry mirror 4 on its back side. A collector lens 5 and a photometric, photoelectric transducer element 6 such as silicon photodiode are disposed below the movable mirror 3 at a location out of a taking light path. The transducer element 6 has a light receiving surface which is disposed opposite to the reflecting surface of the mirror 4 and the front surface of a first blind 12 of a focal plane shutter whenever the movable mirror 3 assumes its 45° position as shown. Accordingly, light from an object being photographed which passes through a taking lens 7 and a diaphragm 14 having an open value and which has transmitted through a half mirror section 3a of the mirror 3 is reflected by the mirror 4 for incidence upon the light receiving surface of the transducer element 6 through the collector lens 5. In this manner, the transducer element 6 effects photometry of light from an object being photographed when the diaphragm 14 is open, before a shutter release takes place. Light from an object being photographed which is reflected by the movable mirror 3 impinges upon a focussing glass 8 and then passes through a pentaprism 9 and an eyepiece 10 to be observed by incidence on the eye 11 of a photographer. When a shutter release takes place, a diaphragm control circuit controls the aperture of the diaphragm 14. As will be described, the aperture of the diaphragm 14 is automatically established in accordance with the amount of light received by the transducer element 6 or the brightness of an object being photographed and film speed used. When the control of diaphragm aperture is completed, the movable mirror 3 is resiliently driven upward to its position 3A shown in phantom line, thus closing the observation light path and opening the taking light path. When the taking light path is open, the first blind of the shutter begins running, and hence light from an object being photographed is focussed on the front surface of the running first blind 12 and the photosensitive surface of a film 13 which becomes exposed as the first blind runs. The focussed light is then reflected by the respective surfaces to impinge upon the transducer element 6 through the collector lens 5, whereby the transducer element 6 effects photometry of the light from an object being photographed subsequent to the shutter release.

Figure 2:
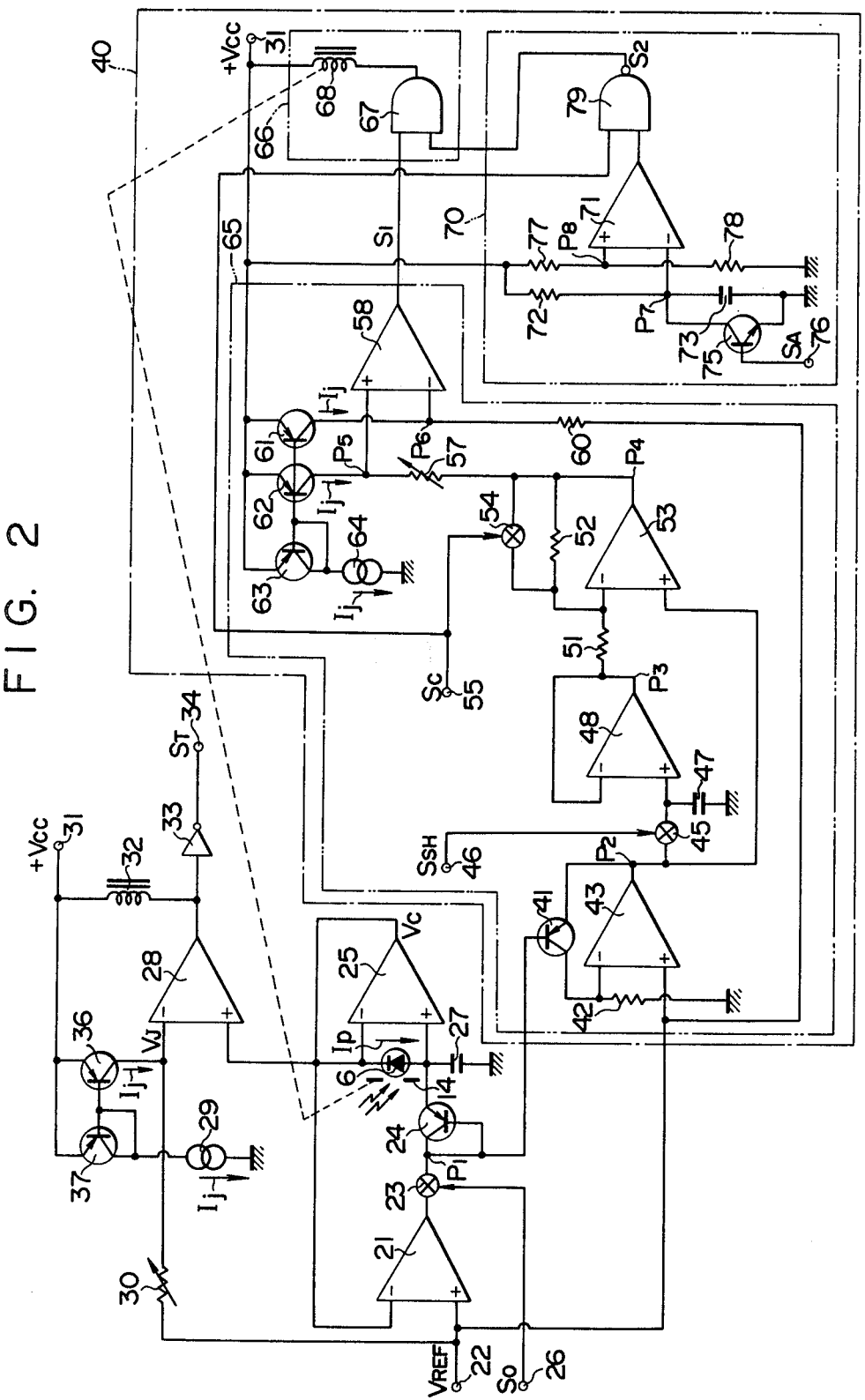
FIG. 2 is a circuit diagram of a diaphragm control circuit according to one embodiment of the invention.

FIG. 2 is a circuit diagram of an exposure control circuit of the camera mentioned above, including a diaphragm control circuit. Referring to FIG. 2, there is provided an operational amplifier 21 having a non-inverting input terminal which is connected to a terminal 22, to which a reference voltage $V_{REF}$ is applied. The output terminal of the amplifier is connected through a semiconductor analog switch 23 to the base and collector of a PNP transistor 24, which provides a logarithmic compression. The emitter of the transistor 24 is connected to the non-inverting input terminal of an operational amplifier 25, which operates as an integrator. The transducer element 6 has its anode connected to the non-inverting input terminal and its cathode connected to the inverting input terminal of the amplifier 25. An integrating capacitor 27 is connected between the non-inverting input terminal of the amplifier 25 and the ground. The semiconductor analog switch 23 includes a control terminal which is connected to a terminal 26, to which a trigger signal $S_0$ is applied. The trigger signal $S_0$ changes from its "H" (high) level to its "L" (low) level in synchronized relationship with the beginning of running of the first blind 12 subsequent to the diaphragm control which takes place in response to the shutter release. The output terminal of the amplifier 25 is connected to the inverting input terminals of the amplifiers 25 and 21, thus forming a feedback loop. The output terminal of the amplifier 25 is also connected to the non-inverting input terminal of an operational amplifier 28, which functions as a comparator. The inverting input terminal of the amplifier 28 is connected to the collector of a PNP transistor 36, and is connected to one end of a variable resistor 30, the other end of which is connected to the terminal 22. The variable resistor 30 is utilized to preset film speed which is used in calculating an exposure period in accordance with film speed information. The base of the transistor 36 is connected to the base and the collector of a PNP transistor 37, which exhibits an identical characteristic with the transistor 36. The collector of the transistor 37 is connected to the ground through a constant current source 29. The emitters of both transistors 36, 37 are connected to a terminal 31, to which a supply voltage +Vcc is applied. The output terminal of the amplifier 28 is connected to one end of an electromagnet 32, the other end of which is connected to the terminal 31. The electromagnet 32 functions to constrain the second blind of the shutter from running. The output terminal of the amplifier 28 is also connected through an inverter 33 to a terminal 34, from which an emission terminate signal ST is delivered to an associated electronic flash.

The junction $P_1$ between the switch 23 and the transistor 24 is connected to the base of a PNP transistor 41 within a diaphragm control circuit 40, more specifically, at the input of TTL diaphragm control signal generator 65 contained therein. The collector of the transistor 41 is connected to the inverting input terminal of an amplifier 43 while its emitter is connected to an output terminal thereof. The inverting input terminal of the amplifier 43 is connected to the ground through a resistor 42 while the non-inverting input terminal is connected to the terminal 22. A network defined by the resistor 42, transistor 41 and amplifier 43 forms together a correction circuit which transforms the brightness value (Bv) of an object being photographed during an open photometry into a linear quantity which is suitable for use in apex calculation.

The output terminal of the amplifier 43 is connected through a semiconductor analog switch 45 to the non-inverting input terminal of an operational amplifier 48, which functions as an impedance converter. The analog switch 45 has a control terminal which is connected to a terminal 46, to which a sample-and-hold signal $S_{SH}$ is applied. The sample-and-hold signal $S_{SH}$ assumes its "H" level before the shutter release, but changes to is "L" level in synchronism with the shutter release. A capacitor 47 is connected between the non-inverting input terminal of the amplifier 48 and the ground for holding an output voltage from the amplifier 43. The inverting input terminal of the amplifier 48 is connected to an output terminal thereof, which is in turn connected through a resistor 51 to the inverting input terminal of an operational amplifier 53 having its non-inverting input terminal directly connected with the output terminal of the amplifier 43. A resistor 52 is connected across the output terminal and the inverting input terminal of the amplifier 53, and is shunted by a semiconductor analog switch 54. The combination of resistors 51, 52 and amplifier 53 defines a non-inverting amplifier. The analog switch 54 has a control terminal which is connected to a terminal 55, to which an electronic flash charged signal Sc is applied. The charged signal Sc changes from its "L" to its "H" level when TTL automatic electronic flash mounted on the camera has its charging operation completed and is ready to emit light. Thus the analog switch 54 is on during a photographing operation which is performed with the aid of the electronic flash, while the switch is off when the electronic flash is not used. In a corresponding manner, the non-inverting amplifier has a different factor of amplification.

The output terminal of the amplifier 53 is connected to one end of a variable resistor 57, the other end of which is connected to the non-inverting input terminal of an operational amplifier 58, functioning as a comparator, and also connected to the collector of a PNP transistor 62. The variable resistor 57 is used to preset film speed which is used in order to determine a diaphragm aperture in accordance with film speed information. The inverting input terminal of the amplifier 58 is connected to the terminal 22 through a resistor 60, which is effective to determine an exposure period under diaphragm control. The inverting input terminal is also connected to the collector of a PNP transistor 61. The transistors 61, 62 have their bases connected to the base and collector of a PNP transistor 63, which exhibits an identical characteristic with these transistors. The collector of the transistor 63 is connected to the ground through a constant current source 64. The emitters of the transistors 61 to 63 are connected to the terminal 31. The output terminal of the amplifier 58 is connected to one input terminal of AND gate 67, which forms part of diaphragm driver circuit 66. The output terminal of the gate 67 is connected to one end of a diaphragm controlling electromagnet 68, the other end of which is connected to the terminal 31.

The diaphragm control circuit 40 includes a network 70 for producing a signal which delays the interruption of an aperture controlling operation. The network 70 includes an operational amplifier 71 functioning as a comparator and having its inverting input terminal connected to the terminal 31 through a resistor 72. A capacitor 73 is connected between the inverting input terminal and ground and cooperates with the resistor 72 to form a time constant circuit. The junction between the resistor 72 and the capacitor 73 is connected to the collector of an NPN transistor 75, the emitter of which is connected to the ground. The base of the transistor 75 is connected to a terminal 76, to which a diaphragm operation detecting signal $S_A$ is applied. The signal $S_A$ changes from its "H" to its "L" level at the time an aperture controlling operation is initiated. The non-inverting input terminal of the amplifier 71 is connected to the junction between a pair of resistors 77, 78 connected in series across the terminal 31 and ground. The potential developed at the junction between these resistors establish a decision level. The output terminal of the amplifier 71 is connected to one input terminal of NAND gate 79, the other input terminal of which is connected to the terminal 55. The output terminal of the gate 79 is connected to the other input of the gate 67.

In operation, when TTL automatic electronic flash is connected with the camera incorporating the diaphragm control circuit 40 and the power switch is turned on, the supply voltage $+Vcc$ is applied to the terminal 31 and the reference voltage $V_{REF}$ is applied to the terminal 22 in the electrical circuit shown in FIG. 2. When the shutter is charged, the trigger signal of "H" level is applied to the terminal 26 and the sample-and-hold signal $S_{SH}$ of "H" level is applied to the terminal 46. When the electronic flash is ready to emit light, the charged signal Sc of "H" level is applied to the terminal 55. The terminal 76 assumes its "H" level. When the camera is directed toward the object being photographed, light from an object which passes through the taking lens 7 and the diaphragm 14 having an open value, as shown in FIG. 1, is reflected by the photometry mirror 4 to be incident on the transducer element 6. Accordingly, a photocurrent Ip is developed by the transducer element 6 in accordance with the amount of light incident thereon. Since the trigger signal of "H" level is applied to the terminal 26, the analog switch 23 is turned on, whereby the amplifiers 21, 25 form together the feedback loop to allow the reference voltage $V_{REF}$ to be applied to the non-inverting input terminal of the amplifier 25. Accordingly, the integrating capacitor 27 is charged to the level of the reference voltage $V_{REF}$.

As the photocurrent Ip is developed by the transducer element 6, the current Ip also flows through the transistor 24 from its emitter to its collector. Accordingly, the point $P_1$ on the collector of the transistor 24 assumes a potential $V_{p1}$, which is defined as follows:

$$V_{p1} = V_{REF} - (kT/q)\ln(Ip/Is_1) \quad (1)$$

where k represents Boltzmann's constant, T absolute temperature, q the charge of an electron, and $Is_1$ the inverse saturation current of the transistor 24.

When the voltage $V_{p1}$ is applied to the base of the transistor 41 in the diaphragm control circuit 40, the correction circuit comprising the transistor 41, resistor 42 and amplifier 43 produces a voltage $V_{p2}$ and at point $P_2$ on the output terminal of the amplifier 43, which is defined as follows (see the equation (1)):

$$\begin{aligned} V_{p2} &= V_{p1} + \frac{kT}{q} \ln \frac{V_{REF}}{Is_2 h_{FE} R_1} \\ &= V_{REF} + \frac{kT}{q} \ln \frac{V_{REF} \cdot Is_1}{Ip \cdot Is_2 h_{FE} R_1} \end{aligned} \quad (2)$$

where $R_1$ represents the resistance of resistor 42, $h_{FE}$ the current amplification factor of the transistor 41, and $Is_2$ the inverse saturation current of the transistor 41. By choosing the transistor 41 so that it be identical in characteristic with the transistor 24, it follows that $Is_1 = Is_2$. Accordingly, the equation (2) can be rewritten as follows:

$$V_{p2} = V_{REF} + \frac{kT}{q} \ln \frac{V_{REF}}{I_{ph}F_ER_1} \quad (3)$$

The voltage $V_{p2}$ is applied to the non-inverting input terminal of the amplifier 53. Since the sample-and-hold signal $S_{SH}$ of "H" level is applied from the terminal 46 to the control terminal of the analog switch 45, the latter is turned on, whereby the voltage $V_{p2}$ is supplied to the non-inverting input terminal of the amplifier 48 through the switch 45, thus charging the capacitor 47.

When the shutter release now takes place, the signal $S_{SH}$ changes to its "L" level, whereby the analog switch 45 is turned off. However, the magnitude of the output voltage $V_{p2}$ from the amplifier 43, as represented by the equation (3), is retained by the capacitor 47 as an open photometry value, which is derived at the output terminal of the amplifier 48. Specifically, representing the photocurrent during the open photometry by $I_{p0}$, a voltage $V_{p3}$ developed at point $P_3$ on the output terminal of the amplifier 48 can be derived from the equation (3), as follows:

$$V_{p3} = V_{REF} + \frac{kT}{q} \ln \frac{V_{REF}}{I_{p0}h_{FE}R_1} \quad (4)$$

The voltage $V_{p3}$ *L derived and retained during the open photometry is applied to the inverting input terminal of the amplifier 53 through resistor 51 while the voltage $V_{p2}$* is applied to the non-inverting input terminal of the same amplifier. Hence, it will be seen from the equations (3) and (4) that representing the resistance of the resistors 51, 52 by $R_2$, $R_3$, respectively, a voltage $V_{p4}$ developed at point $P_4$ on the output terminal of the amplifier 53 is obtained as follows:

$$V_{p4} = V_{p2} + (R_3/R_2)(V_{p2} - V_{p3}) \quad (5)$$

Since the charged signal Sc of "H" level is applied to the terminal 55 to turn the analog switch 54 on, the resistor 52 is short-circuited. Thus, $R_3 = 0$ in the equation (5). The resulting magnitude of the voltage $V_{p4}$ is given as follows:

$$V_{p4} = V_{p2} \quad (6)$$
$$= V_{REF} + \frac{kT}{q} \ln \frac{V_{REF}}{I_{ph}F_ER_1}$$

Thus, when TTL automatic electronic flash mounted on the camera is ready to emit light, the voltage $V_{p4}$ developed at the output terminal of the amplifier 53 is equal to the output voltage $V_{p2}$ from the amplifier 43.

A constant current $I_j$ from the source 64 flows through the collector of the transistor 63, and also flows through the collectors of the transistors 61, 62 by current mirror effect. Similarly, the same current $I_j$ flows through the variable resistor 57 which is connected to the output terminal of the amplifier 53, producing a voltage drop of $R_{sv2}I_j$ where $R_{sv2}$ represents the resistance of the variable resistor 57. Accordingly, a voltage $V_{p5}$ at point $P_5$ which is connected to the non-inverting input terminal of the amplifier 58 is given as follows:

$$V_{p5} = V_{p4} + R_{sv2}I_j \quad (7)$$

The substitution of the equation (6) into the equation (7) yields:

$$V_{p5} = V_{REF} + R_{sv2}I_j + \frac{kT}{q} \ln \frac{V_{REF}}{I_{ph}F_ER_1} \quad (8)$$

The constant current $I_j$ also flows through the resistor 60 to develop a voltage drop of $R_pI_j$ thereacross where $R_p$ represents the resistance of the resistor 60. Accordingly, a voltage $V_{p6}$ at point $P_6$ connected to the inverting input terminal of the amplifier 58 is given as follows:

$$V_{p6} = V_{REF} + R_pI_j \quad (9)$$

Thus, the amplifier 58 compares the voltages $V_{p5}$ and $V_{p6}$ against each other. The amplifier 58 produces an output $S_1$ which assumes its "L" level if $V_{p5} < V_{p6}$ and assumes its "H" level if $V_{p5} > V_{p6}$. The output $S_1$ is fed to one input of the gate 67 in the diaphragm driver circuit 66 as a diaphragm control signal.

In the network 70 which produces a signal for delaying the interruption of an aperture controlling operation, the signal applied to the terminal 76 assumes its "H" level before the shutter release, and hence the transistor 75 is turned on. As a result, voltages $V_{p7}$ and $V_{p8}$ developed at points $P_7$ and $P_8$, respectively, which are connected to the inverting and the non-inverting input terminal of the amplifier 71, are related such that $V_{p7} < V_{p8}$, whereby the amplifier 71 produces an output of "H" level. Representing the resistance of the resistors 77, 78 by $R_A$, $R_B$, respectively, the voltage $V_{p8}$ is given as $V_{p8} = R_B \cdot V_{cc}/(R_A + R_B)$. Since the electronic flash is connected to the camera and the charged signal Sc applied to the terminal 55 assumes its "H" level, the gate 79 produces an output $S_2$ of "L" level, which is fed to the other input of the gate 67 in the diaphragm driver circuit 66 as a signal which delays the interruption of an aperture controlling operation.

Figure 3:
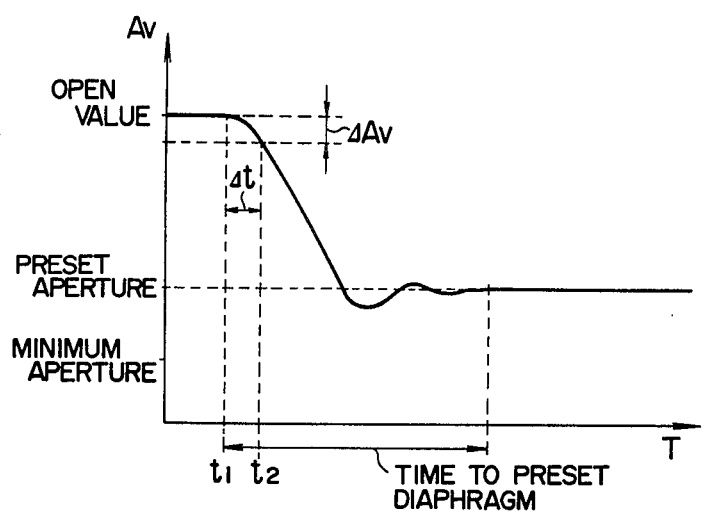
FIG. 3 graphically illustrates a diaphragm control operation performed by the diaphragm control circuit shown in FIG. 2.

Upon shutter release, a diaphragm mechanism, not shown, which may be constructed in known manner, operates to reduce the aperture of the diaphragm 14. At time $t_1$ when the aperture controlling operation is initiated, a diaphragm operation detecting signal $S_A$ of "L" level is applied to the terminal 76, whereby the transistor 75 is turned off, and the current flow through the resistor 72 is diverted through the capacitor 73, thus initiating a charging of the capacitor. The voltage $V_{p7}$ increases as the capacitor 73 is charged with a time constant determined by the resistor 72 and the capacitor 73. At the initiation of the aperture controlling operation, the voltages $V_{p7}$ and $V_{p8}$ are related such that $V_{p7} < V_{p8}$, and the output from the amplifier 71 remains at its "H" level. Accordingly, the output $S_2$ from the gate 79 remains at its "L" level. Thus, from time $t_1$ when the aperture controlling operation is initiated until a given time $\Delta t$ passes which is determined by the time constant of the resistor 72 and capacitor 73, the output $S_2$ remains at its "L" level, which is applied to the gate 67. It will be understood that the output from the gate 67 assumes its "L" level when one or both of the outputs $S_1$ and $S_2$ from the amplifier 58 and the gate 79 assume "L" level, and accordingly the electromagnet 68 remains energized during the time interval $\Delta t$ from time $t_1$, independently from the output level from the amplifier 58. The magnitude of the interval $\Delta t$ will be chosen on the order of 5 ms assuming that it requires a time period of 20 ms for the aperture of the diaphragm 14 to be changed from its open value to its minimum aperture. Referring to FIG. 3, it will be seen that the diaphragm aperture will be reduced by preset value $\Delta Av$ from the open value, which corresponds to the length of the interval $\Delta t$.

As the capacitor 73 is charged until the voltages $Vp_7$ and $Vp_8$ are related such that $Vp_7 \geq Vp_8$ after the time interval $\Delta t$ or at time $t_2$, whereupon the output from the amplifier 71 reverses to its "L" level, whereby the output $S_2$ from the gate 79 will change to its "H" level. In other words, the delay signal to interrupt the aperture controlling operation ceases at this time $t_2$, and thereafter the energization of the electromagnet 68 depends on the level of the output $S_1$ from the amplifier 58.

When an object being photographed is under bright illumination, the magnitude of the photocurrent Ip which flows through the transducer element 6 is high, so that the voltages $Vp_5$ and $Vp_6$ are related such that $Vp_5 < Vp_6$, whereby the amplifier 58 produces an output $S_1$ of "L" level. Hence, the gate 67 produces an output of "L" level, independently from the level of the output $S_2$ from the gate 79 in the network 70, thus allowing the electromagnet 68 to be energized. This causes the aperture of the diaphragm 14 to be gradually reduced. As the aperture of the diaphragm 14 is gradually reduced, the magnitude of the photocurrent Ip decreases gradually, causing a gradual increase in the output voltage $Vp_2$ from the amplifier 43 and the output voltage $Vp_4$ from the amplifier 53, thus increasing the magnitude of the voltage $Vp_5$ until the latter becomes equal to the voltage $Vp_6$, whereupon the output from the amplifier 58 changes from its "L" to its "H" level, thus deenergizing the electromagnet 68. This terminates the aperture controlling operation. Since $Vp_5 = Vp_6$ at this time, we have, from the equations (8) and (9):

$$Rsv_2 Ij + \frac{kT}{q} \ln \frac{V_{REF}}{Ip' h_{FE} R_1} = RpIj \quad (10)$$

The equation (10) represents the criterion for the termination of the aperture controlling operation. In this equation, $Ip'$ represents the magnitude of the photocurrent at the termination of the aperture controlling operation.

Figure 4:
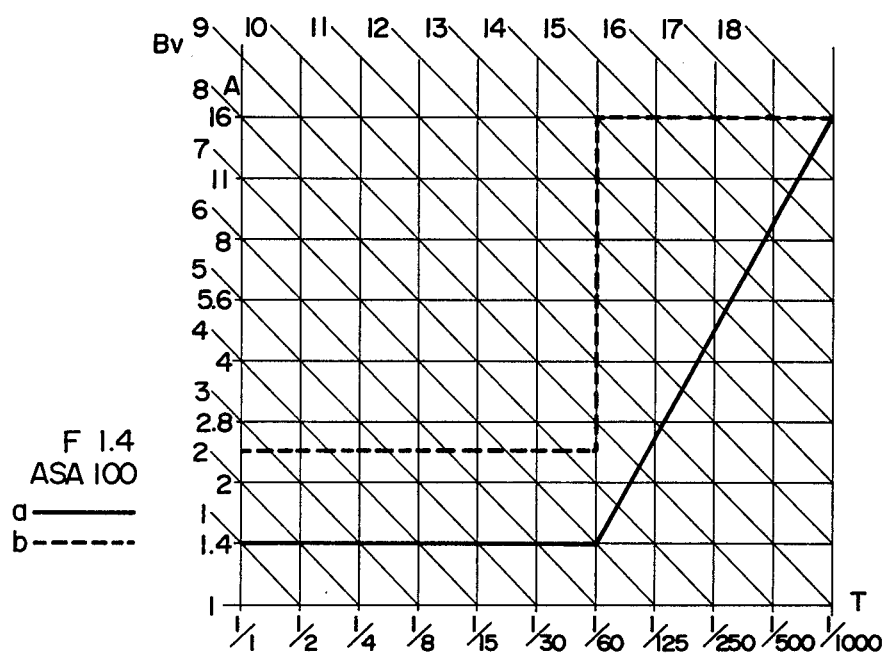
FIG. 4 is a diagram of the diaphragm control.

Referring to the diagram of FIG. 4, which illustrates programs, for a more detailed description, it may be assumed that the variable resistor 57 is adjusted to preset film speed of ASA100. In this instance, the diaphragm control takes place in accordance with a program b shown in broken lines in FIG. 4. Specifically, the program b represents a diaphragm control which establishes an aperture value A which allows an exposure period of 1/60 second to be produced which is substantially synchronized with the operation of the electronic flash for a range of brightness of an object being photographed which is $8.5 \leq Bv \leq 14$.

When the brightness of the object is high and $Bv \geq 8.5$, the voltages $Vp_5$ and $Vp_6$ are related such that $Vp_5 < Vp_6$ as mentioned above, whereby the amplifier 58 produces an output of "L" level to allow the electromagnet 68 to be energized, thereby enabling a diaphragm control in accordance with the criterion defined by the equation (10). Assume that the brightness has a value of $Bv = 10$. As the diaphragm control is continued to reduce the aperture to a value of $A = 4$, the output from the amplifier 58 changes to its "H" level, whereupon the electromagnet 68 is deenergized, terminating the aperture controlling operation while satisfying the criterion defined by the equation (10).

At the termination of the aperture controlling operation, the movable mirror 3 is resiliently driven upward and the first blind 12 of the shutter is allowed to begin running while simultaneously supplying the trigger signal $S_0$ of "L" level from the terminal 26 to the analog switch 23, which is therefore turned off. The feedback loop formed around the amplifier 21 is then interrupted, and the photocurrent Ip ceases to flow through the transistor 24, but is diverted through the integrating capacitor 27. In this manner, the integrating operation is initiated at the time when the analog switch 23 is turned off. As the capacitor 27 is charged by the photocurrent Ip, the voltage thereacross gradually increases from the value corresponding to the reference voltage $V_{REF}$. The voltage Vc across the capacitor 27 is applied from the output terminal of the amplifier 25 to the non-inverting input terminal of the amplifier 28 for comparison with the decision voltage Vj which is applied to the inverting input terminal thereof. Representing the resistance of the variable resistor 30 by $Rsv_1$ and the current flow through the constant current source 29 by Ij, the collector current of the transistor 36 is also equal to Ij by the current mirror effect. Hence $$Vj = V_{REF} + Rsv_1 Ij \quad (11)$$

Representing the capacitance of the capacitor 27 by $C_1$, the integrated voltage Vc is given as follows:

$$Vc = V_{REF} + (Ip/C_1)t \quad (12)$$

So long as the integrated voltage Vc is less than the decision voltage Vj or $(Ip/C_1)t < Rsv_1 Ij$, as derived from the equations (11) and (12), the output from the amplifier 28 remains at its "L" level, and hence the electromagnet 32 remains energized, constraining the second blind of the shutter from running. Also the emission terminate signal supplied to the terminal 34 is maintained at its "H" level.

Since the described diaphragm control establishes a diaphragm aperture (for example, $A = 4$ for $Bv = 10$) which prevents an exposure period from being reduced beyond 1/60 second, it is impossible for the integrated voltage Vc to reach the level of the decision voltage Vj within an integrating period which is less than 1/60 second. When a time period of 1/60 second passes, the electronic flash is activated for emission of light. Simultaneously, the integrated voltage Vc reaches the level of the decision voltage Vj. Thus, $(Ip/C_1)t \geq Rsv_1 Ij$, whereby the output of the amplifier 28 changes to its "H" level, deenergizing the electromagnet 32 to allow the second blind to begin running. Simultaneously, the output is fed through the inverter 33 to the terminal 34, which delivers the emission terminate signal $S_T$ of "L" level to the electronic flash. The termination of light emission from the electronic flash and the completion of running of the second blind of the shutter complete an exposure which has been effected with the aid of TTL automatic electronic flash.

As mentioned, the diaphragm control circuit 40 is arranged to establish an aperture in a range of $2.2 \leq A \leq 16$ which produces an exposure period of $T \approx 1/60$ for a brightness of an object being photographed in a range of $8.5 \leq Bv \leq 14$, as indicated by the program b in FIG. 4, whenever a taking lens of F1.4 is employed with film speed of ASA100 during a photographing operation which takes place with the aid of TTL automatic electronic flash. With this diaphragm control, the majority of the exposure to the film is given by natural light, with the electronic flash being activated to emit light during the final stage of the exposure. Accordingly, the exposure is terminated immediately after the emission of light from the electronic flash, requiring a minimum amount of emission from the electronic flash. This minimizes the time interval required for the electronic flash to prepare for a next emission or a charging operation therein inasmuch as the entire charge on the main capacitor thereof is not discharged if the flash is of series controlled type.

When the brightness of an object being photographed extends beyond the above given range either above or below it, an exposure period mentioned above which is synchronized with the operation of the electronic flash cannot be obtained. Since the minimum aperture is $A=16$, the photocurrent Ip cannot reach the value of Ip' if the aperture is reduced to its minimum value of $A=16$ for a brightness which is $Bv>14$, resulting in an exposure period which terminates before the synchronization with the operation of the electronic flash is possible, thus completing a photographing operation with natural light alone and without light emission from the electronic flash.

Considering now a brightness of an object being photographed which is represented by $Bv<8.5$, the open value of the lens which is F1.4 causes the photocurrent Ip flowing through the transducer element 6 to be less in magnitude than the photocurrent Ip' for a brightness $Bv<7$, so that the voltages $Vp_5$ and $Vp_6$ are related such that $Vp_5 \geq Vp_6$, causing the amplifier 58 to produce an output of "H" level. For a brightness in a range of $7 \leq Bv < 8.5$, the voltages $Vp_5$ and $Vp_6$ are related such that $Vp_5 < Vp_6$, so that the output from the amplifier 58 is at its "L" level. However, the output of the amplifier 58 shortly changes to its "H" level as a result of the diaphragm control. Specifically, if the electromagnet 68 is controlled in accordance with the output $S_1$ from the amplifier 58 alone, the diaphragm 14 will be controlled to provide an aperture which is close to the open value in order to produce an exposure period which is close to 1/60 second whenever an object being photographed is under dark illumination. However, the operation of the network 70 prevents an aperture from being established which is equal to the open value.

Specifically, if the output from the amplifier 58 assumes its "H" level from time $t_1$ which represents the initiation of the aperture controlling operation or changes from its "L" to its "H" level before the time interval $\Delta t$ passes since the time $t_1$, as a result of the brightness being $Bv<7$ or $7 \leq Bv < 8.5$, the network 70 delivers the delay signal of "L" level to the gate 67 from the gate 79 during the given interval $\Delta t$ from time $t_1$ when the aperture controlling operation is initiated. As a result, the electromagnet 68 is energized during the interval $\Delta t$, thus reducing the aperture of the diaphragm 14 by a given number of steps $\Delta Av$. For F1.4, the aperture will be $A=2.2$, as indicated by the program b in FIG. 4. When a picture is taken with the aid of the electronic flash for a brightness of $Bv<8.5$, the aperture of the diaphragm 14 is controlled to a value $A=2.2$, followed by the emission of light from the electronic flash at a given synchronized timing. Subsequently, the electronic flash ceases to emit light when the amount of exposure given to the film has reached a proper value as a result of the emission from the electronic flash, and simultaneously the second blind of the shutter begins running to terminate an exposure. Thus, it will be seen that even if an object being photographed is under dark illumination, no aperture value at the open value of $A=1.4$ or close thereto is not used, but a diaphragm aperture which is by a given number of steps reduced from the open value is established for taking a picture with the aid of the electronic flash. In this manner, an "out-of-focus" picture is avoided and a satisfactory image quality is assured.

When the electronic flash is not utilized, the charged signal Sc is not applied to the terminal 55, which therefore assumes "L" level to turn the analog switch 54 off. Accordingly, the resistor 52 is connected across the amplifier 53, which produces an output voltage $Vp_4$, which is derived, by the substitution of the equations (3) and (4) into the equation (5), as follows:

$$Vp_4 = V_{REF} + \frac{kT}{q} \ln \frac{V_{REF}}{Iph_{FE}R_1} + \frac{R_3}{R_2}\left(\frac{kT}{q} \ln \frac{Ip_0}{Ip}\right) \quad (13)$$

Thus, the amplifier 53 produces the voltage $Vp_4$ defined by the equation (13) upon shutter release. The voltage $Vp_5$ applied to the non-inverting input terminal of the amplifier 58 is given as follows:

$$Vp_5 = V_{REF} + R_{sv2}Ij + \frac{kT}{q} \ln \frac{V_{REF}}{Iph_{FE}R_1} + \frac{R_3}{R_2}\left(\frac{kT}{q} \ln \frac{Ip_0}{Ip}\right) \quad (14)$$

The voltages $Vp_5$ and $Vp_6$ are compared against each other by the amplifier 58. The resulting diaphragm control is represented by a program a shown in bold line in FIG. 4. Specifically, when the brightness of an object being photographed is high as indicated by $Bv \geq 7$, the photocurrent Ip has a larger magnitude, so that the voltages $Vp_5$ and $Vp_6$ are related such that $Vp_5 < Vp_6$, causing the amplifier 58 to produce an output of "L" level. The electromagnet 68 is energized to reduce the aperture of the diaphragm 14 in a gradual manner. The magnitude of the voltage $Vp_5$ increases as the aperture is reduced until $Vp_5 = Vp_6$, whereupon the output of the amplifier 58 changes to its "H" level, terminating the aperture controlling operation. From the equations (9) and (14), we have:

$$R_{sv2}Ij + \frac{kT}{q} \ln \frac{V_{REF}}{Ip'h_{FE}R_1} + \frac{R_3}{R_2}\left(\frac{kT}{q} \ln \frac{Ip_0}{Ip'}\right) = RpIj \quad (15)$$

The equation (15) represents the criterion to define the termination of the aperture controlling operation. Also in this equation, $Ip_0$ represents the photocurrent when the diaphragm 14 remains open while Ip' the photocurrent at the termination of the aperture controlling operation.

At the termination of the aperture controlling operation, the analog switch 23 is turned off, allowing the integrating photometry to be initiated. This causes the output voltage Vc from the amplifier 25 to increase with a slope defined by the equation (12). When the voltage Vc becomes equal to the decision voltage Vj defined by the equation (11), the output from the amplifier 28 changes to its "H" level, deenergizing the electromagnet 32 to thereby allow the second blind to being running in order to terminate an exposure. At this time, the photometry of light reflection from film surface establishes an exposure period in a range of nearly $1/60 \geq T \geq 1/1000$ since the aperture is controlled to a value within a range of $1.4 \leq A \leq 16$ for a brightness of an object being photographed which is in a range of $7 \leq Bv \leq 18$, as will be noted from the program a shown in FIG. 4.

When the brightness is low as indicated by $Bv < 7$, the photocurrent Ip has a reduced magnitude, so that the voltages $Vp_5$ and $Vp_6$ are related such that $Vp_5 \geq Vp_6$, causing the amplifier 58 to produce an output of "H" level. When the electronic flash is not employed, the charged signal Sc of "H" level is not applied to the terminal 55, so that the output from the gate 79 in the network 70 assumes its "H" level. Thus, the gate 79 feeds "H" level signal to the gate 67 at time $t_1$ when the aperture controlling operation is to be initiated, so that the output level from the gate 67 coincides with the output level from the amplifier 58 to cause the electromagnet 68 to be deenergized. Accordingly, the diaphragm 14 is fixed to the open value of $A = 1.4$. Referring to the program a shown in FIG. 4, it will be seen that an exposure period in a range of nearly $1/1 \geq T \geq 1/60$ is obtained.

In the described diaphragm control circuit, the charged signal Sc is fed to the gate 79 so that the delay signal is obtained as a logical product of the charged signal and the output from the amplifier 71. Alternatively, it is also possible to produce a change from "H" to "L" level at the terminal 76 when the aperture controlling operation is initiated, only in the presence of the charged signal Sc or a signal indicative of the fact that the electronic flash is in use, such as a signal indicating the initiation of a charging operation within the electronic flash. In this instance, NAND gate 79 may be replaced by an inverter interposed between the amplifier 71 and the gate 67.

What is claimed is:

1. A diaphragm control circuit for TTL automatic electronic flash for use in a camera of the TTL direct photometry type and capable of photometry of light reflection from a film surface, the camera having the capability to control the amount of light emission from an associated TTL automatic electronic flash; the diaphragm control circuit comprising:

a TTL diaphragm control signal generator circuit responsive to a photometric value determined by the photometry of light reflection from a reflecting surface by producing a diaphragm control signal which is effective to establish a diaphragm aperture which assures a proper exposure with an exposure period which is synchronized with the operation of the electronic flash, the diaphragm aperture established being intermediate an open value and a minimum aperture;

a network for producing a signal which delays the termination of an aperture controlling operation for a given time interval since the initiation of the aperture controlling operation whenever there is a signal indicative of one of two conditions including the use of the electronic flash such as an electronic flash charged signal and the initiation of a charging operation within the electronic flash;

and a diaphragm driver circuit for driving an electromagnet which controls a diaphragm aperture in response to a logical combination of the diaphragm control signal and the delay signal.

2. A diaphragm control circuit according to claim 1 in which the network comprises a correction circuit for converting a value representative of the brightness of an object being photographed which is determined during open photometry into a linear quantity which is suitable for use in an apex calculation, a non-inverting amplifier receiving an output voltage from the correction circuit as an input thereto, a capacitor for holding the output voltage from the correction circuit in response to a sample-and-hold signal whenever a shutter of the camera is charged, a first analog switch responsive to the sample-and-hold signal, a second analog switch responsive to a signal from the electronic flash which indicates that the electronic flash mounted on the camera has completed its charging operation and is ready to emit light, an aperture determining circuit for adding an output from the correction circuit when the signal from the electronic flash is detected to a voltage indicative of film speed used to determine an aperture value of the camera, an exposure period determining circuit for providing a preset voltage which allows an exposure period of the camera to be established close to the synchronization with the operation of the electronic flash, and a voltage comparator for comparing an output voltage from the diaphragm value determining circuit against an output voltage from the exposure period determining circuit.

3. A diaphragm control circuit according to claim 2 in which the diaphragm value determining circuit comprises a constant current source, a current mirror circuit, and a variable resistor which is used to preset film speed.

4. A diaphragm control circuit according to claim 2 in which the exposure period determining circuit comprises a resistor connected to a terminal, to which a reference voltage is applied, the resistance of the resistor being effective to determine an exposure period, a current source, and a current mirror circuit.

5. A diaphragm control circuit according to claim 1 in which the network comprises a resistor connected across a terminal, to which a supply voltage is applied, and the ground for providing a decision voltage, a time constant circuit including a capacitor and a resistor having a given time constant, a charging operation of the capacitor being initiated at the initiation of the aperture controlling operation which occurs in response to a shutter release, a voltage comparator for comparing the voltage across the capacitor against the decision voltage, and a logical gate for forming a logical combination of an output signal from the voltage comparator and an electronic flash charged signal to thereby produce a signal which delays the termination of the aperture controlling operation.

6. A diaphragm control circuit according to claim 5 in which the charging operation of the capacitor in the time constant circuit is controlled by a transistor, the conduction of which is in turn controlled by a diaphragm operation detecting signal, the transistor bypassing a charging current before a shutter release.

7. A diaphragm control circuit according to claim 5 in which the logical gate comprises a NAND gate.

8. A diaphragm control circuit according to claim 1 in which the logical combination formed in the diaphragm driver circuit is performed by an AND gate.

9. A diaphragm control circuit according to claim 5 in which the logical gate comprises an inverter.

10. A diaphragm control circuit for TTL automatic electronic flash for use in a camera of the TTL direct photometry type and capable of photometry of light reflection from a film surface, the camera having the capability to control the amount of light emission from an associated electronic flash, the diaphragm control circuit comprising:

a TTL diaphragm control signal generator circuit responsive to a photometric value determined by the photometry of light reflection from a reflecting surface for producing a diaphragm control signal for establishing a suitable diaphragm aperture, the diaphragm aperture established being intermediate an open value and a minimum aperture;

a network for producing a signal which delays the termination of an aperture controlling operation for a given time interval since the initiation of the aperture controlling operation whenever there is a signal indicative of one of two conditions including the use of the electronic flash such as an electronic flash charged signal and a signal indicating the initiation of a changing operation within the electronic flash;

and a diaphragm driver circuit for driving an electromagnet which controls a diaphragm aperture in response to a logical combination of the diaphragm control signal and the delay signal.

* * * * *

UNITED STATES PATENT AND TRADEMARK OFFICE
CERTIFICATE OF CORRECTION

PATENT NO. : 4,474,451

DATED : Oct. 2, 1984

INVENTOR(S) : Kazunori Mizokami

It is certified that error appears in the above—identified patent and that said Letters Patent is hereby corrected as shown below:

Column 7, line 28 cancel "L".

Column 7, lines 28 to 30 from "derived" to "voltage" should not be italicized.

Column 12, line 68 change "being" to --begin--.

Signed and Sealed this

Nineteenth Day of March 1985

[SEAL]

Attest:

DONALD J. QUIGG

*Attesting Officer*   *Acting Commissioner of Patents and Trademarks*